(12) United States Patent
McClure

(10) Patent No.: US 6,345,791 B1
(45) Date of Patent: Feb. 12, 2002

(54) STREAMWISE VARIABLE HEIGHT RIBLETS FOR REDUCING SKIN FRICTION DRAG OF SURFACES

(75) Inventor: Paul D. McClure, Fort Worth, TX (US)

(73) Assignee: Lockheed Martin Corporation, Bethesda, MD (US)

( * ) Notice: Subject to any disclaimer, the term of this patent is extended or adjusted under 35 U.S.C. 154(b) by 0 days.

(21) Appl. No.: 09/548,970

(22) Filed: Apr. 13, 2000

(51) Int. Cl.⁷ ............................................... B64C 23/00
(52) U.S. Cl. ......................... 244/200; 244/130; 244/199
(58) Field of Search .................. 244/198, 200, 244/199, 130

(56) References Cited

U.S. PATENT DOCUMENTS

| | | |
|---|---|---|
| 4,650,138 A | 3/1987 | Grose |
| 4,706,910 A | 11/1987 | Walsh et al. |
| 4,736,912 A | 4/1988 | Loebert |
| 4,750,693 A | 6/1988 | Lobert et al. |
| 4,753,401 A | 6/1988 | Bechert |
| 4,759,516 A | 7/1988 | Grose |
| 4,863,121 A | 9/1989 | Savill |
| 4,865,271 A | 9/1989 | Savill |

FOREIGN PATENT DOCUMENTS

| | | | |
|---|---|---|---|
| DE | 3609541 | * 9/1987 | .................. 244/130 |
| GB | 730121 | * 5/1955 | .................. 244/130 |

OTHER PUBLICATIONS

WO 93/19981, Savill, "Control of Fluid Flow" Oct. 1993.*

* cited by examiner

*Primary Examiner*—Galen L. Barefoot
(74) *Attorney, Agent, or Firm*—Bracewell & Patterson, L.L.P.

(57) ABSTRACT

A series of parallel riblets extend from a smooth, aerodynamic surface for reducing the skin friction drag of the surface an airstream flows around it. The riblets extend longitudinally along the surface and have a triangular cross-section in the transverse direction. The apex of the cross-section defines a continuous, undulated ridge with peaks and valleys. Measured from the surface, the peaks have a greater height than the valleys. The interaction of the riblets with the structure of the turbulent boundary layer of the airstream reduces the skin friction drag coefficient of the surface by approximately 12% over an identical smooth surface without the riblets. This reduction occurs despite the significant increase in wetted area of the riblet-covered surface over the smooth surface.

18 Claims, 2 Drawing Sheets

STREAMWISE VARIABLE HEIGHT RIBLETS FOR REDUCING SKIN FRICTION DRAG OF SURFACES

BACKGROUND OF THE INVENTION

1. Technical Field

The present invention relates in general to an improved apparatus for reducing the skin friction drag of an aerodynamic or hydrodynamic surface, and in particular to an improved riblet design for reducing the skin friction drag coefficient of aerodynamic or hydrodynamic surfaces.

2. Description of the Prior Art

It is relatively well known that the aerodynamic drag of a surface may be reduced by applying a microscopic "texture" to the otherwise smooth surface. Although the exact fluid dynamic mechanism at work in this drag reduction is not well understood, it is speculated that the reduction relates to controlling the turbulent vortices in the boundary layer adjacent to the surface. The microscopic texture reduces the skin friction drag of solids moving through fluids (e.g., aircraft, ships, cars, etc.), and of fluids moving along solids (e.g., pipe flow, etc.). Although the practical use of such texturing has been very limited, one well known exception was the application of a texture to the racing yacht, Stars and Stripes.

The geometric form for the microscopic, friction-reducing texture is known as "riblets." As shown in FIG. 1, riblets 11 are typically an integrated series of groove-like peaks 13 and valleys 15 with V-shaped cross-sections. Riblets 11 always extend along the aerodynamic surface 17 in the direction of fluid flow 19. The height of the riblets and the spacing between the riblets are usually uniform and on the order of 0.001 to 0.01 inches for most applications. Dimensionless units, sometimes referred to as wall units, are conventionally utilized in describing fluid flows of this type. The wall unit h+ is the non-dimensional distance away from the wetted surface or more precisely in the direction normal to the surface, extending into the fluid. Thus h+ is a non-dimensional measurement of the height of the riblets. The wall unit s+ is the non-dimensional distance tangent to the local surface and perpendicular to the flow direction, thus the non-dimensional distance between the riblets. In the prior art riblets, h+ and s+ are in the range between 10 and 20. Previous riblet designs consisted of an adhesive film applied to a smooth solid surface. However, with advanced manufacturing techniques, the same shapes may be directly formed and integrated into the structure of the aerodynamic surface.

The interaction of riblets with the structure of the turbulent boundary layer of the fluid reduces the skin friction drag coefficient (Cdf) of the surface by approximately 6% compared to an identical smooth surface without riblets. This reduction occurs despite the significant increase in "wetted area" (the surface area exposed to the fluid stream) of a riblet-covered surface over a smooth surface. In attempts to further reduce the Cdf, modifications to conventional V-shaped riblets have been proposed. Examples include rounding of the peaks 21 and/or valleys 23 (FIG. 2), as well as even smaller V-shaped notches 31 in the sides of the larger V-shaped riblets 33 (FIG. 3). In summary, all of the work has been with riblets having a constant geometry or cross-section in the streamwise direction. An improved riblet design that decreases skin friction drag with less concomitant increase in wetted area than conventional riblets would be desired.

SUMMARY OF THE INVENTION

A series of parallel riblets extend from a smooth, aerodynamic surface for reducing the skin friction drag of the surface an airstream flows around it. The riblets extend longitudinally along the surface and have a triangular cross-section in the transverse direction. The apex of the cross-section defines a continuous, undulated ridge with peaks and valleys. Measured from the surface, the peaks have a greater height than the valleys. The interaction of the riblets with the structure of the turbulent boundary layer of the airstream reduces the skin friction drag coefficient of the surface by approximately 8% to 20% over an identical smooth surface without the riblets. The reduction is better than the 6% reported for conventional riblets because the wetted area is increased less with this invention than with conventional riblets.

DETAILED DESCRIPTION OF THE PREFERRED EMBODIMENT

Figure 1:
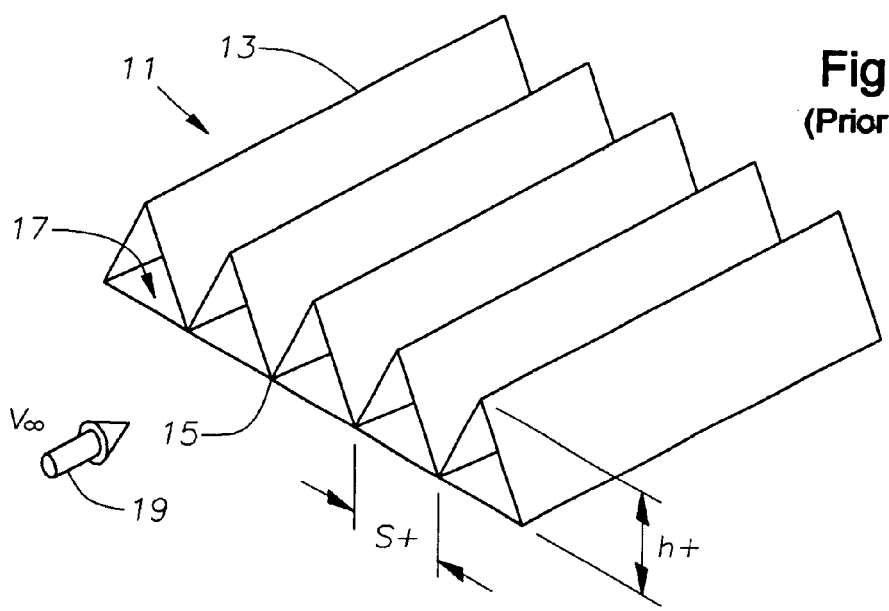
FIG. 1 is a schematic isometric view of one type of prior art riblets.
Figure 2:
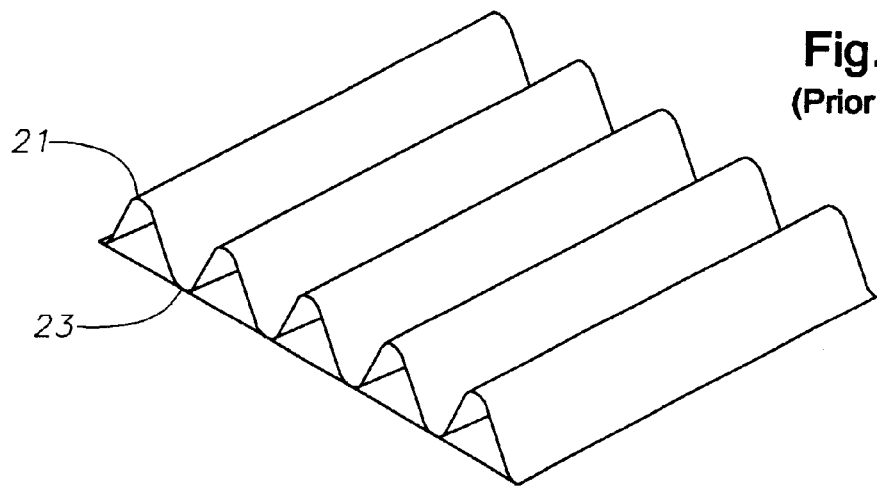
FIG. 2 is a schematic isometric view of another type of prior art riblets.
Figure 3:
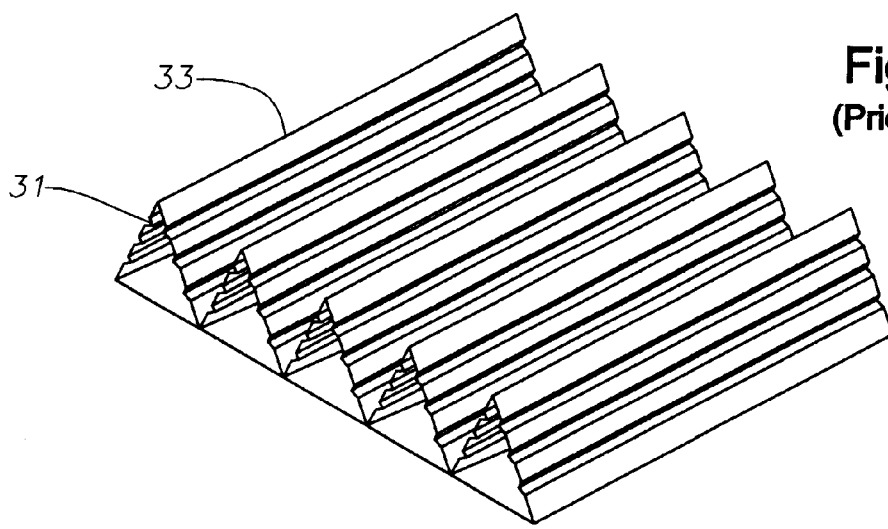
FIG. 3 is a schematic isometric view of yet another type of prior art riblets.
Figure 4:
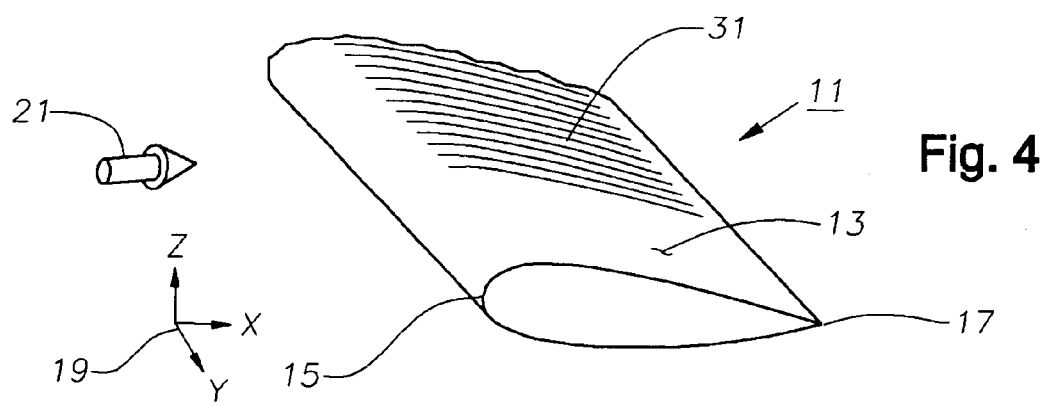
FIG. 4 is an isometric view of a wing.

Referring to FIG. 4, a wing 11 having a substantially smooth aerodynamic surface 13, a leading edge 15, and a trailing edge 17 is shown. Although a wing is depicted, those skilled in the art will recognize that the invention is readily adaptable to other aerodynamic surfaces as well. A Cartesian coordinate system 19 is provided for reference purposes. The leading edge 15 and trailing edge 17 are oriented in a generally longitudinal direction along the x-axis of coordinate system 19. Wing 11 is subjected to a fluid flow (represented by arrow 21) that is also generally oriented in the longitudinal direction.

Figure 5:
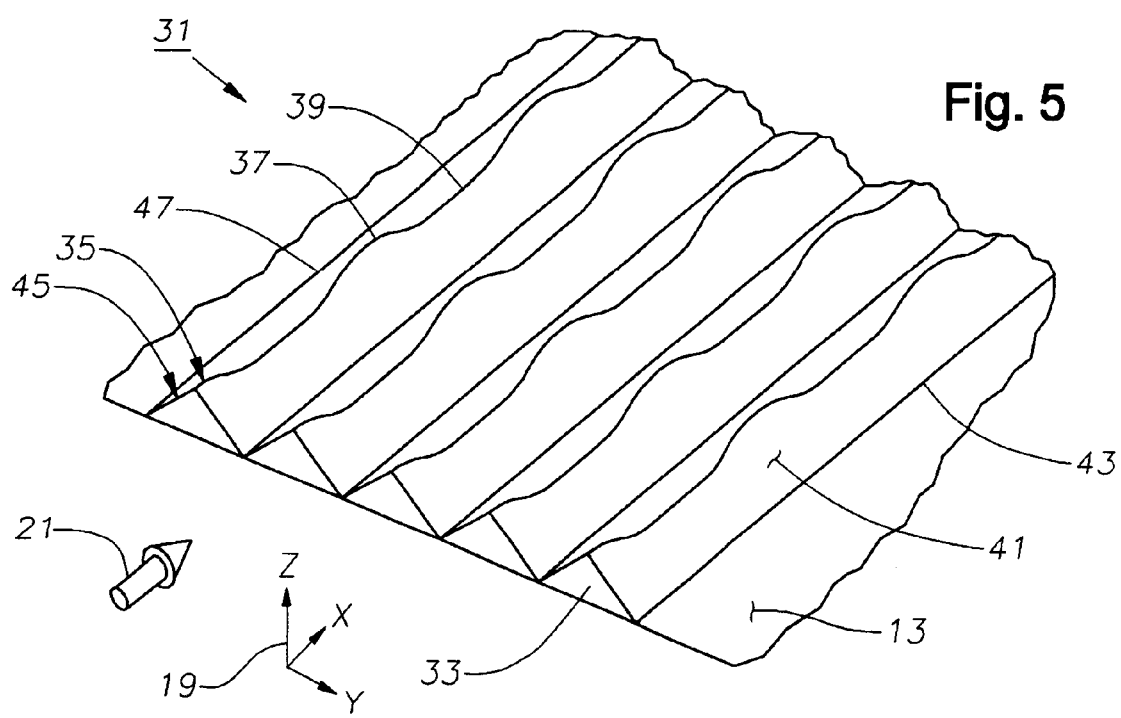
FIG. 5 is an enlarged isometric view of riblets constructed in accordance with the invention and mounted to the wing of FIG. 4.

A plurality of parallel riblets 31 extend from wing 11 for reducing the skin friction drag of surface 13 as fluid flow 21 passes around surface 11. Although riblets 31 appear visible in FIG. 4, they are actually microscopic in size. As shown in FIG. 5, riblets 31 are an integrated series of structures that extend along surface 13 substantially in the x-direction. In the embodiment shown, the height in the z-direction and spacing in the y-direction of riblets 31 are uniform and on the order of 0.001 to 0.01 inches. The spacing between peaks 37 in the x-direction is a design variable. Larger spacing in the x-direction leads to larger drag reductions until a point is reached where the spacing is too large and turbulent vortices are able to settle down near to the original surface between peaks 37. Preferably, in terms of wall units, the spacing between peaks 37 in the x-direction is between 10 and 100. Riblets may be applied to surface 13 as an adhesive film or, with advanced manufacturing techniques, directly formed and integrated into the structure of surface 13.

In the version illustrated, each riblet 31 has a generally triangular cross-section 33 in the y-z-plane. The apex of cross-section 33 defines a continuous ridge 35 with peaks 37 and valleys 39. The peaks 37 and valleys 39 are symmetrically spaced apart from one another along the ridge 35 of each riblet 31. Each peak 37 has a generally arcuate shape in the x-z-plane (FIGS. 5 and 6), and each valley 39 has a substantially flat shape in the x-z-plane. In addition, the peaks 37 align with other ones of the peaks 37 in the y-direction to form a row of peaks 37, and the valleys 39 align with other ones of the valleys 39 in the y-direction to form a row of valleys 39.

Figure 6:
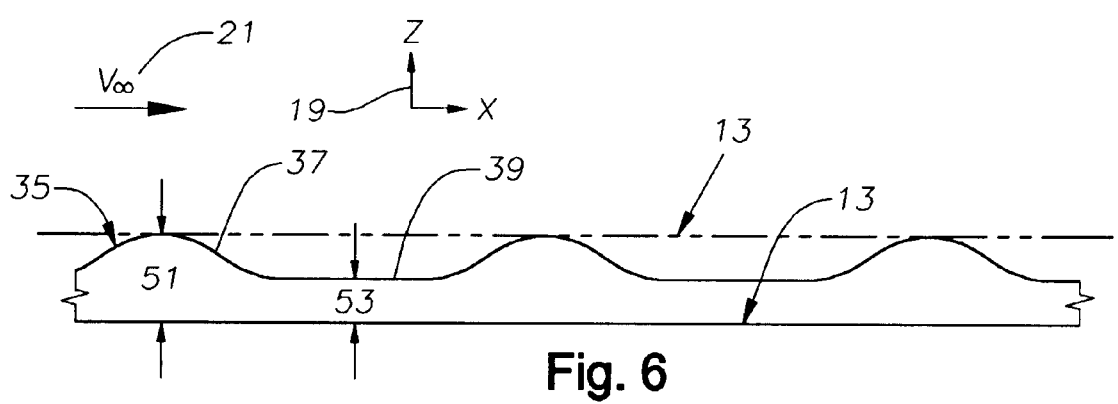
FIG. 6 is a side view comparison of one of the riblets of FIG. 4 and one of the prior art riblets of FIG. 1 on the wing of FIG. 4.

Each riblet 31 also has a first side surface 41 with a first longitudinal edge 43, and a second side surface 45 with a second longitudinal edge 47. The first longitudinal edges 43 of riblets 31 adjoin the second longitudinal edges 47 of adjacent ones of the riblets 31. As shown in FIG. 6, each riblet 31 also has an undulated cross-section in the x-z-plane such that the peaks 37 of the ridge 35 have a z-dimension 51 that is greater than a z-dimension 53 of the valleys 39 of the ridge 35.

In operation, the interaction of riblets 31 with the structure of the turbulent boundary layer of the fluid reduces the skin friction drag coefficient (Cdf) of surface 13 by approximately 8% to 20% compared to an identical smooth surface without riblets 31. This reduction occurs despite the significant increase in "wetted area" (the surface area exposed to the fluid stream) of the riblet-covered surface over the smooth surface. As illustrated in FIG. 6, riblets 31 have much less wetted area than conventional riblets 11.

The invention has several advantages including a skin friction drag reduction that is greater than that obtained with conventional riblets having a constant streamwise geometry. This new riblet design results in 8% to 20% friction drag reduction, compared to only a 6% reduction for conventional riblets. The streamwise variable height riblets of the present invention are designed to alter the boundary layer structure for reduced skin friction drag with less wetted area. The magnitude and length of riblet height reduction determines the reduction in wetted area and the actual reduction in skin friction drag for each application.

While the invention has been shown or described in only some of its forms, it should be apparent to those skilled in the art that it is not so limited, but is susceptible to various changes without departing from the scope of the invention.

What is claimed is:

1. An apparatus for reducing skin friction drag on a surface, the apparatus comprising:

a plurality of parallel riblets wherein, in a Cartesian coordinate system with x, y, and z-axes, each of the riblets extends lengthwise in an x-direction and has a longitudinal profile in an x-z-plane with a variable height in a z-direction, and wherein the riblets are adapted to be mounted to a surface that is subjected to fluid flow in the substantially x-direction; and wherein each of the riblets has a plurality of peaks in the x-z plane separated by valleys of lesser height in the z-direction.

2. The apparatus of claim 1 wherein the peaks are generally arcuate.

3. The apparatus of claim 1 wherein the valleys are substantially flat.

4. The apparatus of claim 1 wherein the valleys have substantially constant lengths in the x-direction.

5. The apparatus of claim 1 wherein the riblets are generally triangular in cross-section in a y-z-plane.

6. An aerodynamic surface, comprising:

a leading edge, a trailing edge, an x-axis extending longitudinally between the leading and trailing edges, a y-axis perpendicular to the x-axis, and a z-axis perpendicular to both the x-axis and the y-axis, wherein the surface is adapted to be subjected to fluid flow in a substantially x-direction; and a plurality of parallel, microscopic riblets on the surface extending substantially in the x-direction for reducing skin friction drag, each of the riblets having a continuous longitudinal profile in an x-z plane with a plurality of peaks separated by valleys, wherein the peaks have a z-dimension that is greater than a z-dimension of the valleys.

7. The aerodynamic surface of claim 6 wherein the peaks have a generally arcuate shape in the x-z-plane.

8. The aerodynamic surface of claim 6 wherein the valleys have a substantially flat shape in the x-z-plane.

9. The aerodynamic surface of claim 6 wherein a spacing between the peaks along the x-axis is in the range from 10 to 100 in wall units.

10. The aerodynamic surface of claim 6 wherein at least some of the peaks have the same longitudinal profile as other ones of the peaks, and wherein at least some of the valleys have the same longitudinal profile as other ones of the valleys.

11. The aerodynamic surface of claim 6 wherein the riblets are bonded to the surface.

12. The aerodynamic surface of claim 6 wherein the riblets are integrally formed in the surface.

13. The apparatus of claim 6 wherein the riblets are generally triangular in cross-section in a y-z-plane.

14. In an aerodynamic surface having a leading edge, a trailing edge, an x-axis extending longitudinally between the leading and trailing edges, a y-axis perpendicular to the x-axis, and a z-axis perpendicular to both the x-axis and the y-axis, wherein the surface is subjected to fluid flow in a substantially x-direction, an improved apparatus for reducing skin friction drag, comprising:

a plurality of parallel, microscopic riblets on the surface extending continuously along the x-axis, each of the riblets having a generally triangular cross-section in a y-z-plane, a continuous ridge with a plurality of peaks and a plurality of valleys, a first side surface with a first longitudinal edge, a second side surface with a second longitudinal edge, wherein the first longitudinal edges of the riblets intersect the second longitudinal edges of adjacent ones of the riblets; and wherein each riblet has an undulated cross-section in an x-z-plane such that the peaks of the ridge have a z-dimension that is greater than a z-dimension of the valleys of the ridge.

15. The apparatus of claim 14 wherein each of the peaks has a generally arcuate shape in the x-z-plane.

16. The apparatus of claim 14 wherein each of the valleys has a substantially flat shape in the x-z-plane.

17. The apparatus of claim 14 wherein the peaks and valleys are symmetrically spaced apart from one another.

18. The apparatus of claim 14 wherein at least some of the peaks have the same longitudinal profile as other ones of the peaks, and wherein at least some of the valleys have the same longitudinal profile as other ones of the valleys.

* * * * *